(12) United States Patent
Kobayashi

(10) Patent No.: US 10,160,157 B2
(45) Date of Patent: Dec. 25, 2018

(54) ELONGATED FILM MANUFACTURING METHOD, LONG POLARIZING FILM, AND LIQUID-CRYSTAL DISPLAY DEVICE

(71) Applicant: ZEON CORPORATION, Tokyo (JP)

(72) Inventor: Takao Kobayashi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 203 days.

(21) Appl. No.: 15/035,792

(22) PCT Filed: Nov. 13, 2014

(86) PCT No.: PCT/JP2014/080084
§ 371 (c)(1),
(2) Date: May 11, 2016

(87) PCT Pub. No.: WO2015/072518
PCT Pub. Date: May 21, 2015

(65) Prior Publication Data
US 2016/0318233 A1    Nov. 3, 2016

(30) Foreign Application Priority Data

Nov. 15, 2013  (JP) .................................. 2013-237140

(51) Int. Cl.
*B29C 55/10*      (2006.01)
*B29D 11/00*      (2006.01)
(Continued)

(52) U.S. Cl.
CPC .............. *B29C 55/10* (2013.01); *B29C 55/14* (2013.01); *B29D 11/00644* (2013.01);
(Continued)

(58) Field of Classification Search
None
See application file for complete search history.

(56) References Cited

U.S. PATENT DOCUMENTS

2009/0130341 A1*  5/2009  Asada .................... B29C 55/045
                                                        428/1.1
2010/0002170 A1    1/2010  Itadani et al.
(Continued)

FOREIGN PATENT DOCUMENTS

CN    103180122 A    6/2013
JP    2007-030466 A  2/2007
(Continued)

OTHER PUBLICATIONS

Jan. 20, 2015 International Search Report issued in International Patent Application No. PCT/JP2014/080084.
(Continued)

*Primary Examiner* — Lisa L Herring
(74) *Attorney, Agent, or Firm* — Oliff PLC

(57) ABSTRACT

The present invention provides a method for producing a stretched film, the method including: (a) a first step of stretching a long-length pre-stretch film in a diagonal direction at a stretch ratio B1 to obtain a long-length intermediate film; and after the first step, (b) a second step of performing free uniaxial stretching of the intermediate film in a flow direction at a stretch ratio B2 while continuously conveying the intermediate film to obtain a long-length stretched film, wherein the stretch ratios satisfy B1>B2.

5 Claims, 2 Drawing Sheets

(51) Int. Cl.
*G02B 5/30* (2006.01)
*G02F 1/1335* (2006.01)
*B29C 55/14* (2006.01)
*B29L 11/00* (2006.01)
*B29C 55/06* (2006.01)
*B29C 55/16* (2006.01)

(52) U.S. Cl.
CPC ......... *G02B 5/3025* (2013.01); *G02B 5/3033* (2013.01); *G02F 1/133528* (2013.01); *B29C 55/065* (2013.01); *B29C 55/16* (2013.01); *B29D 11/00788* (2013.01); *B29L 2011/00* (2013.01)

(56) References Cited

U.S. PATENT DOCUMENTS

| | | |
|---|---|---|
| 2011/0097546 A1 | 4/2011 | Itadani et al. |
| 2013/0231455 A1* | 9/2013 | Yasutomo ............. B29C 55/045 528/370 |
| 2015/0192722 A1 | 7/2015 | Asada |

FOREIGN PATENT DOCUMENTS

| | | |
|---|---|---|
| JP | 2008-110573 A | 5/2008 |
| JP | 2012-025167 A | 2/2012 |
| JP | 2012-101466 A | 5/2012 |
| WO | 2007/061105 A1 | 5/2007 |
| WO | 2007/111313 A1 | 10/2007 |
| WO | 2012/070451 A1 | 5/2012 |

OTHER PUBLICATIONS

Jan. 20, 2015 Written Opinion issued in International Patent Application No. PCT/JP2014/080084.

* cited by examiner

ELONGATED FILM MANUFACTURING METHOD, LONG POLARIZING FILM, AND LIQUID-CRYSTAL DISPLAY DEVICE

FIELD

The present invention relates to a method for producing a stretched film, a long-length polarizing film including the stretched film produced by this method, and a liquid crystal display device.

BACKGROUND

In liquid crystal display devices, optical members such as a phase difference film are used in order to improve performance. When the phase difference film is used for antireflection for mobile devices, organic EL television and the like, and optical compensation for the liquid crystal display device, a slow axis of the phase difference film is required to be in an angle neither parallel nor perpendicular to the transmission axis of a polarizer. In contrast, the transmission axis of the polarizer is usually in parallel with the long side direction or the short side direction of the rectangular display face of the device. Consequently, a rectangular phase difference film having a slow axis in a diagonal direction to the sides of the phase difference film is required.

Conventionally, a phase difference film has been produced by lengthwise stretch or transverse stretch of a long-length pre-stretch film. Here, the lengthwise stretch means the stretch of the long-length film in a longitudinal direction and the transverse stretch means the stretch of the long-length film in a width direction. In order to obtain the rectangular phase difference film having the slow axis in a diagonal direction from such a long-length film, the phase difference film is required to be cut out so that the sides of the phase difference film face in a direction diagonal to the width direction of the long-length film. Such production, however, increases the amount of discarded films or causes difficulty in roll-to-roll production, and therefore, the production efficiency becomes low.

Consequently, it has been suggested that a long-length pre-stretch film is stretched in a diagonal direction in order to improve the production efficiency (refer to Patent Literatures 1 to 5).

CITATION LIST

Patent Literature

Patent Literature 1: Japanese Patent Application Laid-open No. 2007-030466 A
Patent Literature 2: International Publication No. 2007/061105
Patent Literature 3: International Publication No. 2007/111313
Patent Literature 4: Japanese Patent Application Laid-open No. 2008-110573 A
Patent Literature 5: Japanese Patent Application Laid-open No. 2012-101466 A

SUMMARY

Technical Problem

When a stretched film is produced by stretching a film in a diagonal direction in accordance with the conventional production methods described in Patent Literatures 1 to 5, a stretched film having a slow axis in a direction diagonal to the width direction can be produced. In such conventional production methods, however, many wrinkles may appear on the stretched film when the stretched film having a large NZ coefficient is produced. Therefore, the conventional methods have had difficulty in production of the long-length stretched film having the slow axis in a direction diagonal to the width direction and having the large NZ coefficient.

The present invention has been developed in view of the problems. An object of the present invention is to provide a method for easily producing a stretched film having a slow axis in a direction diagonal to the width direction and having a large NZ coefficient; a long-length polarizing film including the stretched film produced by the production method; and a liquid crystal display device including a polarizing plate cut out from the polarizing film.

Solution to Problem

As a result of intensive studies for solving the problems, the inventors of the present invention have found that a stretched film having a slow axis in a direction diagonal to the width direction and having a large NZ coefficient can be easily produced by the combination of carrying out stretching the film in a diagonal direction and performing free uniaxial stretching of the diagonally stretched film in a flow direction in this order and setting the stretch ratio B1 in the diagonal direction larger than the stretch ratio B2 in the flow direction. The invention has been completed based on this finding.

Accordingly, the present invention is as follows:

(1) A method for producing a stretched film, the method comprising:

(a) a first step of stretching a long-length pre-stretch film in a diagonal direction at a stretch ratio B1 to obtain a long-length intermediate film; and after the first step, (b) a second step of performing free uniaxial stretching of the intermediate film in a flow direction at a stretch ratio B2 while continuously conveying the intermediate film to obtain a long-length stretched film, wherein the stretch ratios satisfy B1>B2.

(2) The method for producing a stretched film according to (1), wherein an average NZ coefficient of the stretched film is 2.0 to 3.0.

(3) The method for producing a stretched film according to (1) or (2), wherein the stretch ratio B1 at the first step is 1.5 times to 4.0 times; and the stretch ratio B2 at the second step is 1.1 times to 2.0 times.

(4) The method for producing a stretched film according to any one of (1) to (3), wherein the intermediate film has a slow axis in a range of 10° to 35° on average with respect to a width direction of the intermediate film; and the stretched film has a slow axis in a range of 10° to 80° on average with respect to a width direction of the stretched film.

(5) The method for producing a stretched film according to any one of (1) to (4), wherein a stretching temperature T1 at the first step and a stretching temperature T2 at the second step satisfy T1−5° C.<T2<T1+5° C.

(6) The method for producing a stretched film according to any one of (1) to (5), wherein an average in-plane retardation Re1 of the intermediate film is 300 nm or more; and an average in-plane retardation Re2 of the stretched film is 100 nm to 200 nm.

(7) A long-length polarizing film comprising:
the stretched film obtained by the production method according to any one of (1) to (6); and
a long-length polarizer.

(8) A liquid crystal display device comprising:
a polarizing plate cut out from the long-length polarizing film according to (7).

Advantageous Effects of Invention

According to the present invention, a method for easily producing a stretched film having a slow axis in a direction diagonal to the width direction and having a large NZ coefficient; a long-length polarizing film including the stretched film produced by the production method; and a liquid crystal display device including a polarizing plate cut out from the polarizing film, can be provided.

DESCRIPTION OF EMBODIMENT

Figure 1:
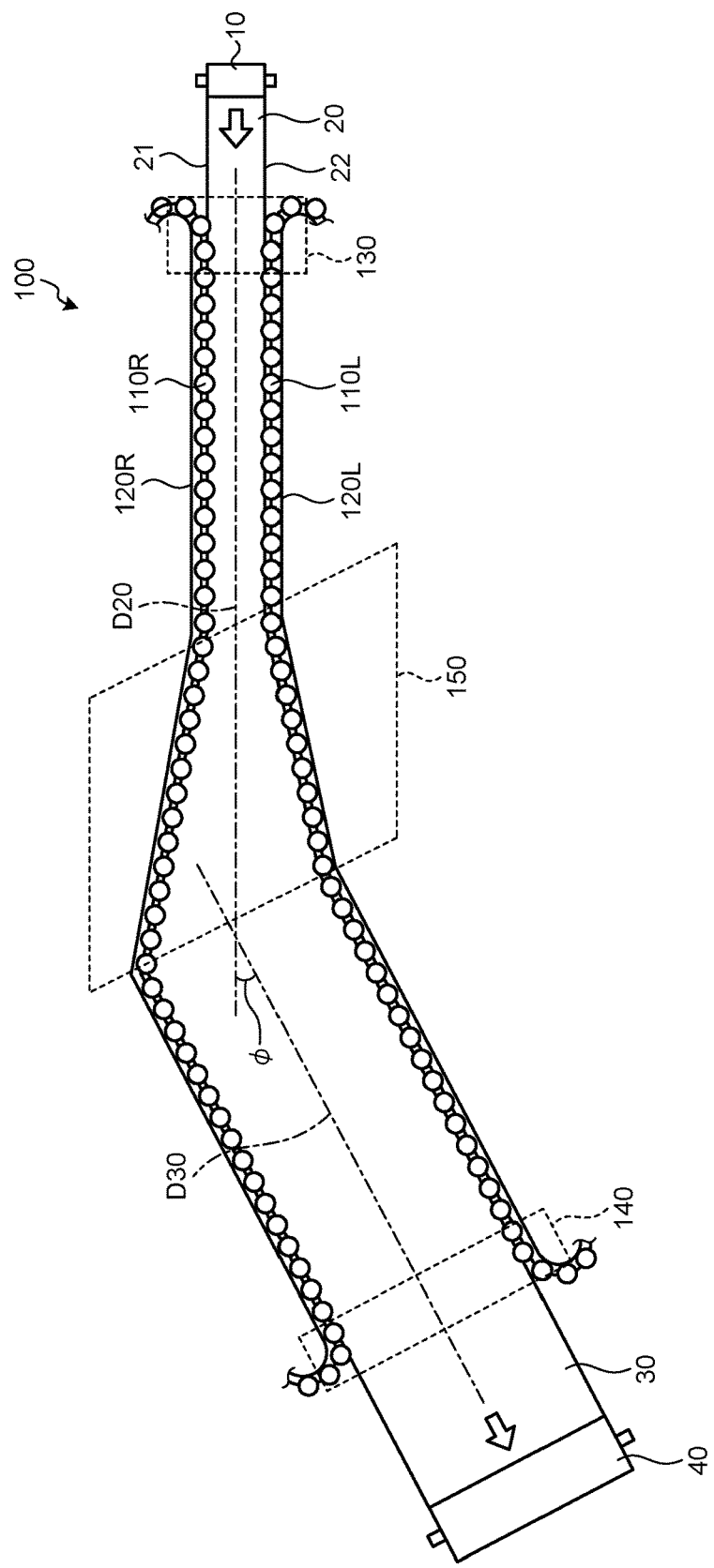
FIG. 1 is a plan view schematically illustrating tenter apparatus according to one embodiment of the present invention.

Hereinafter, the present invention will be described in more detail with reference to the embodiments and illustrations. However, the present invention will not be limited to the embodiments and illustrations to be shown below, and may be arbitrarily modified without departing from the scope of the appended claims and the scope of the equivalents thereof.

In the following description, the expression "long-length" means a shape whose length is at least 5 times or more longer than a width, and preferably 10 times or more longer than the width, and specifically means a shape having a length capable of being wound up into a roll shape for storage or transportation.

In the following description, unless otherwise specified, the in-plane retardation of the film is a value represented by $(nx-ny) \times d$. In addition, unless otherwise specified, the NZ coefficient is a value represented by $(nx-nz)/(nx-ny)$. Here, nx represents a refractive index in a direction perpendicular to the thickness direction (in-plane direction) of the film and in a direction providing the maximum refractive index. ny represents a refractive index in the in-plane direction of the film and in a direction orthogonal to the direction of nx. nz represents a refractive index in the thickness direction of the film. d represents the thickness of the film. Unless otherwise specified, a measurement wavelength is 590 nm.

In the following description, "(meth)acrylate" includes "acrylate" and "methacrylate". "Meth(acrylic)" include "acrylic" and "methacrylic". Furthermore, "(meth)acrylonitrile" includes "acrylonitrile" and "methacrylonitrile".

In the following description, unless otherwise specified, the expression that directions of components are "parallel", "perpendicular", and "orthogonal" may include a range of error which may not compromise the effects of the present invention, for example, within a range of ±5°.

In the following descriptions, unless otherwise specified, the diagonal direction of the long-length film is the in-plane direction of the film and the direction neither parallel nor perpendicular to the width direction of the film.

In the following description, unless otherwise specified, the lengthwise direction of the long-length film is a longitudinal direction of the film and usually a direction parallel to the flow direction of the film in the production line.

In the following description, unless otherwise specified, the "polarizing plate" may include not only a rigid member, but also a flexible member such as a resin-made film.

1. Embodiment

The method for producing a stretched film according to one embodiment of the present invention comprising: (a) a first step of stretching a long-length pre-stretch film in a diagonal direction at a stretch ratio B1 to obtain a long-length intermediate film; and after the first step, (b) a second step of performing free uniaxial stretching of the intermediate film in a flow direction at a stretch ratio B2 while continuously conveying the intermediate film to obtain a long-length stretched film.

1.1. Pre-Stretch Film

Usually, a resin film is used as the pre-stretch film. In addition, usually, a thermoplastic resin is used as the resin for forming the resin film. Examples of such a thermoplastic resin may include polyolefin resins such as a polyethylene resin and a polypropylene resin; a polymeric resin having an alicyclic structure such as a norbornene-based resin; cellulose-based resins such as a triacetylcellulose resin; a polyimide resin, a polyamideimide resin, a polyamide resin, a polyether imide resin, a polyether ether ketone resin, a polyether ketone resin, a polyketone sulfide resin, a polyether sulfone resin, a polysulfone resin, a polyphenylene sulfide resin, a polyphenylene oxide resin, a polyethylene terephthalate resin, a polybutylene terephthalate resin, a polyethylene naphthalate resin, a polyacetal resin, a polycarbonate resin, a polyarylate resin, a (meth)acrylic resin, a polyvinyl alcohol resin, a polypropylene resin, a cellulose-based resin, an epoxy resin, a phenol resin, a (meth)acrylic ester-vinyl aromatic compound copolymer resin, an isobutene/N-methyl-maleimide copolymer resin, and a styrene/acrylonitrile copolymer resin. As the polymer, one type thereof may be used alone, or two or more types thereof may be used in combination at any ratio.

Among them, the polymeric resin having the alicyclic structure is preferable. The polymeric resin having the alicyclic structure is a resin containing a polymer having an alicyclic structure. In addition, the polymer having the alicyclic structure is a polymer whose structure unit has an alicyclic structure. The polymer having the alicyclic structure may have the alicyclic structure in the main chain or may have the alicyclic structure in the side chain. As the polymer having the alicyclic structure, one type thereof may be used alone, or two or more types thereof may be used in combination at any ratio. Among them, a polymer having an alicyclic structure in the main chain is preferable from the viewpoints of mechanical strength and heat resistance.

Examples of the alicyclic structure may include a saturated alicyclic structure (cycloalkane) and an unsaturated alicyclic structure (cycloalkene and cycloalkyne). Among them, the cycloalkane structure and the cycloalkene structure are preferable, for example, from the viewpoints of mechanical strength and heat resistance. Among them, the cycloalkane structure is particularly preferable.

The number of carbon atoms constituting the alicyclic structure is preferably 4 or more and more preferably 5 or more and preferably 30 or less, more preferably 20 or less, and particularly preferably 15 or less per alicyclic structure. When the number of carbon atoms constituting the alicyclic structure is the above-described number, the resin containing the polymer having the alicyclic structure has highly balanced mechanical strength, heat resistance, and moldability and thus is suitable.

In the polymer having the alicyclic structure, the ratio of the structure unit having the alicyclic structure is appropriately selected depending on the intended use and preferably 55% by weight or more, more preferably 70% by weight or more, particularly preferably 90% by weight or more, and usually 100% by weight or less. When the ratio of the structure unit having the alicyclic structure in the polymer having the alicyclic structure is within this range, the resin containing the polymer having the alicyclic structure has excellent transparency and heat resistance.

Among the polymers having the alicyclic structures, a cycloolefin polymer is preferable. The cycloolefin polymer is a polymer having a structure that is obtained by polymerizing a cycloolefin monomer. The cycloolefin monomer is a compound having a ring structure formed by carbon atoms and having a polymerizable carbon-carbon double bond in the ring structure. Examples of the polymerizable carbon-carbon double bond may include a carbon-carbon double bond polymerizable in, for example, ring-opening polymerization. Examples of the ring structure of the cycloolefin monomer may include a monocyclic, a polycyclic, a fused polycyclic, and a bridged-cyclic structure and a polycyclic structure combining these structures. Among them, the polycyclic cycloolefin monomer is preferable from the viewpoint of highly balanced properties, such as dielectric characteristics and heat resistance, of the resulting polymer.

Preferable examples of the cycloolefin polymer may include a norbornene-based polymer, a monocyclic olefin polymer, a cyclic conjugated diene polymer, and hydrogenated products thereof. Among them, the norbornene-based polymer is suitable because of its excellent moldability.

Examples of the norbornene-based polymer may include a ring-opening polymer of a monomer having a norbornene structure, a ring-opening copolymer of a monomer having a norbornene structure and an optional monomer, or a hydrogenated product thereof; an addition polymer of a monomer having a norbornene structure, an addition copolymer of a monomer having a norbornene structure and an optional monomer, or a hydrogenated product thereof. Among them, the hydrogenated product of the ring-opening (co)polymerization polymer of the monomer having the norbornene structure is particularly preferable from the viewpoints of moldability, heat resistance, low hygroscopicity, size stability, and light weight. Here, the "(co)polymer" means the polymer and the copolymer.

Examples of the monomer having the norbornene structure may include bicyclo[2.2.1]hept-2-ene (common name: norbornene), tricyclo[4.3.0.1$^{2,5}$]deca-3,7-diene (common name: dicyclopentadiene), 7,8-benzotricyclo[4.3.0.1$^{2,5}$] deca-3-ene (common name: methanotetrahydrofluorene), tetracyclo[4.4.0.1$^{2,5}$.1$^{7,10}$]dodeca-3-ene (common name: tetracyclododecene), and the derivatives of these compounds (for example, a derivative having a substituent in the ring). Examples of the substituent may include an alkyl group, an alkylene group, and a polar group. These substituents may be the same as or different from each other and a plurality of substituents may be bonded to the ring. As the monomer having the norbornene structure, one type thereof may be used alone, or two or more types thereof may be used in combination at any ratio.

Examples of the types of the polar group may include a hetero atom or an atomic group having a hetero atom. Examples of the hetero atom may include an oxygen atom, a nitrogen atom, a sulfur atom, a silicon atom, and a halogen atom. Specific examples of the polar group may include a carboxy group, a carbonyoxycarbonyl group, an epoxy group, a hydroxy group, an oxy group, an ester group, a silanol group, a silyl group, an amino group, a nitrile group, and a sulfonic acid group.

Examples of the optional monomer that is ring-opening copolymerizable with a monomer having a norbornene structure may include monocyclic olefins such as cyclohexene, cycloheptene, and cyclooctene, and derivatives thereof; and cyclic conjugated dienes such as cyclohexadiene and cycloheptadiene and derivatives thereof. As the optional monomer that is ring-opening copolymerizable with the monomer having the norbornene structure, one type thereof may be used alone or two or more types thereof may be used in combination at any ratio.

The ring-opening polymer of the monomer having the norbornene structure and the ring-opening copolymer of the monomer having the norbornene structure and the optional monomer can be produced by, for example, polymerizing or copolymerizing the monomer in the presence of a known ring-opening polymerization catalyst.

Examples of the optional monomer that is addition copolymerizable with the monomer having the norbornene structure may include α-olefins having the carbon number of 2 to 20 such as ethylene, propylene and 1-butene, and derivatives thereof; cyclo-olefins such as cyclobutene, cyclopentene and cyclohexene, and derivatives thereof and; non-conjugated dienes such as 1,4-hexadiene, 4-methyl-1,4-hexadiene, and 5-methyl-1,4-hexadiene. Among them, the α-olefins are preferable and ethylene is more preferable. As the optional monomer that is addition copolymerizable with the monomer having the norbornene structure, one type thereof may be used alone, or two or more types thereof may be used in combination at any ratio.

An addition polymer of a monomer having a norbornene structure and an addition copolymer of a monomer having a norbornene structure and an optional monomer can be produced by, for example, polymerizing or copolymerizing the monomer in the presence of a known addition polymerization catalyst.

The hydrogenated product of the ring-opening polymer of the monomer having the norbornene structure, the hydrogenated product of the ring-opening copolymer of the monomer having the norbornene structure and the optional monomer that is ring-opening copolymerizable with the monomer having the norbornene structure, the hydrogenated product of the addition polymer of the monomer having the norbornene structure, and the hydrogenated product of the addition copolymer of the monomer having the norbornene structure and the optional monomer that is ring-opening copolymerizable with the monomer having the norbornene structure can be produced by, for example, hydrogenating the carbon-carbon unsaturated bond to preferably 90% or more in the solutions of these polymers. The hydrogenation can be carried out in the presence of a known hydrogenation catalyst containing a transition metal such as nickel and palladium.

Among the norbornene-based polymer, a norbornene-based polymer having X: a bicyclo[3.3.0]octane-2,4-diyl-ethylene structure and Y: a tricyclo[4.3.0.1$^{2,5}$]decane-7,9-diyl-ethylene structure as structure units, an amount of these structure units of 90% by weight or more to the total structure units in the norbornene-based polymer, and the ratio X:Y of the content ratio of X to the content ratio of Y of 100:0 to 40:60 in a weight ratio is preferable. By using such a polymer, a resin layer containing the norbornene-based polymer can have no size change for a long period of time and can have excellent stability for the optical properties.

Examples of the monocyclic olefin polymer may include addition polymers of the cyclic olefin monomers having a monocycle such as cyclohexene, cycloheptene, and cyclooctene.

Examples of the cyclic conjugated diene polymer may include polymers obtained by the cyclization reaction of the conjugated diene monomer such as 1,3-butadiene, isoprene, and chloroprene; 1,2-addition polymers or 1,4-addition polymers of cyclic conjugated diene monomers such as cyclopentadiene and cyclohexadiene; and the hydrogenated products thereof.

The weight average molecular weight (Mw) of the polymer having the alicyclic structure is preferably 10,000 or more, more preferably 15,000 or more, and particularly preferably 20,000 or more and preferably 100,000 or less, more preferably 80,000 or less, and particularly preferably 50,000 or less. When the weight average molecular weight is in such a range, the stretched film has highly balanced mechanical strength and moldability and thus is suitable. Here, the weight average molecular weight is a weight average molecular weight in terms of polyisoprene or polystyrene measured by gel permeation chromatography using cyclohexane as a solvent. If the sample is not dissolved in cyclohexane, however, toluene may be used as a solvent in the gel permeation chromatography.

The molecular weight distribution (weight average molecular weight (Mw)/number average molecular weight (Mn)) of the polymer having the alicyclic structure is preferably 1.2 or more, more preferably 1.5 or more, and particularly preferably 1.8 or more and preferably 3.5 or less, more preferably 3.0 or less, and particularly preferably 2.7 or less. By setting the molecular weight distribution equal to or more than the lower limit of this range, the productivity of the polymer can be improved and the production cost can be reduced. In addition, by setting it equal to or less than the upper limit, the amount of the low molecular weight component becomes small and thus relaxation at the time of high temperature exposure is reduced and thus the stability of the stretched film can be improved.

In addition, the resin for forming the pre-stretch film and the stretched film can contain optional components other than the polymer. Examples of the optional components may include additives such as colorants including pigments and dyes; plasticizers; fluorescent whitening agents; dispersing agents; heat stabilizers; light stabilizers; ultraviolet absorbers; antistatic agents; antioxidants; fine particulates; and surfactants. As the optional components, one type thereof may be used alone, or two or more types thereof may be used in combination at any ratio. However, the amount of the polymer contained in the resin is preferably 50% by weight to 100% by weight, or 70% by weight to 100% by weight.

The glass transition temperature Tg of the resin for forming the pre-stretch film and the stretched film is preferably 100° C. or more, more preferably 110° C. or more, and particularly preferably 120° C. or more and preferably 190° C. or less, more preferably 180° C. or less, and particularly preferably 170° C. or less. By setting the glass transition temperature equal to or more than the lower limit of this range, the durability of the stretched film under a high temperature environment can be improved. In addition, by setting it equal to or less than the upper limit, the stretching treatment is easily carried out.

The absolute value of the photoelastic coefficients of the resin for forming the pre-stretch film and the stretched film is preferably $10 \times 10^{-12}$ Pa$^{-1}$ or less, more preferably $7 \times 10^{-12}$ Pa$^{-1}$ or less, particularly preferably $4 \times 10^{-12}$ Pa$^{-1}$ or less, and usually 0 Pa$^{-1}$ or more. By having such a photoelastic coefficient, the fluctuation of the in-plane retardation of the stretched film can be reduced. Here, the photoelastic coefficient C is a value represented by $C=\Delta n/\sigma$ where the birefringence is $\Delta n$ and the stress is $\sigma$.

In this embodiment, stretching process will be described with reference to an example that an unstretched film to which stretching treatment is not applied is used as the pre-stretch film. Such an unstretched film can be obtained by, for example, a cast molding method, an extrusion molding method, and an inflation molding method. Among these methods, the extrusion molding method is preferable because the amount of the residual volatile component is small and the size stability is excellent.

1.2. First Step

In the method for producing the stretched film according to one embodiment of the present invention, a first step of providing a long-length pre-stretch film, and thereafter stretching the long-length pre-stretch film in a diagonal direction to obtain an intermediate film is carried out. Usually, at the first step, the pre-stretch film is stretched by using tenter apparatus while the pre-stretch film is continuously conveyed in a longitudinal direction.

FIG. 1 is a plan view schematically illustrating tenter apparatus 100 according to one embodiment of the present invention.

As illustrated in FIG. 1, the tenter apparatus 100 according to one embodiment of the present invention is apparatus for stretching a pre-stretch film 20 from a feed roll 10 in a diagonal direction thereof under a heating environment with an oven that is not illustrated.

The tenter apparatus 100 includes a plurality of gripping elements 110R and 110L and a pair of guide rails 120R and 120L. The gripping elements 110R and 110L are provided so that each of both edge parts 21 and 22 of the pre-stretch film 20 can be gripped. In addition, the guide rails 120R and 120L are provided at both sides of a film conveying path for guiding the gripping elements 110R and 110L.

The gripping elements 110R and 110L are provided so as to be able to run along the guide rails 120R and 120L. In addition, the gripping elements 110R and 110L each are provided so as to be able to run at a constant speed while keeping a certain distance to the front and the rear gripping elements 110R and 110L, respectively. Furthermore, the gripping elements 110R and 110L are constituted to be capable of gripping both edge parts 21 and 22 in the width direction of the pre-stretch film 20 supplied sequentially to the tenter apparatus 100 at an inlet part 130 of the tenter apparatus 100 and releasing the stretched film at an outlet part 140 of the tenter apparatus 100.

The guide rails 120R and 120L have an asymmetric shape in accordance with the conditions of the direction of the slow axis and the stretch ratio of an intermediate film 30 to be produced. In the tenter apparatus 100 according to this embodiment, a stretch zone 150 in which the distance between the guide rails 120R and 120L becomes wider toward the downstream side is provided. In the stretch zone 150, the shapes of the guide rails 120R and 120L are set so that the travel distance of one gripping element 110R is longer than the travel distance of the other gripping element 110L. Consequently, the shapes of the guide rails 120R and 120L in the tenter apparatus 100 is set to be able to convey the pre-stretch film 20 so that the gripping elements 110R and 110L are guided by the guide rails 120R and 120L to turn the traveling direction of the pre-stretch film 20 to the left. In this embodiment, unless otherwise specified, the traveling direction of the long-length film means a moving direction of the midpoint in the width direction of the film. In this embodiment, unless otherwise specified, "right" and "left" represent directions observed from upstream to downstream in the conveying direction.

In addition, the guide rails 120R and 120L have an endless continuous track so that the gripping elements 110R and 110L can revolve along the predetermined track. Consequently, the tenter apparatus 100 has a constitution in which the gripping elements 110R and 110L releasing the pre-stretch film 20 at the outlet part 140 of the tenter apparatus 100 are sequentially returned to the inlet part 130.

The stretch of the pre-stretch film 20 using the tenter apparatus 100 is carried out as follows:

The pre-stretch film 20 is fed from the feed roll 10 and the pre-stretch film 20 is continuously supplied to the tenter apparatus 100.

The tenter apparatus 100 sequentially grips both edge parts 21 and 22 of the pre-stretch film 20 at the inlet part 130 of the tenter apparatus 100 by the gripping elements 110R and 110L. The pre-stretch film 20 whose both edge parts 21 and 22 are gripped is conveyed along with the travel motion of the gripping elements 110R and 110L. In this embodiment, as described above, the shapes of the guide rails 120R and 120L are set so as to turn the traveling direction of the pre-stretch film 20 to the left. Consequently, the distance of the track where one gripping element 110R travels while gripping the pre-stretch film 20 is longer than the distance of the track where the other gripping element 110L travels while gripping the pre-stretch film 20. Therefore, in a pair of gripping elements 110R and 110L facing the direction perpendicular to the traveling direction of the pre-stretch film 20 at the inlet part 130 of the tenter apparatus 100, the left gripping element 110L precedes the right gripping element 110R at the outlet part 140 of the tenter apparatus 100 and thus the pre-stretch film 20 is stretched in a diagonal direction to obtain the long-length intermediate film 30. The obtained intermediate film 30 is released from the gripping elements 110R and 110L at the outlet part 140 of the tenter apparatus 100, wound, and collected as a roll 40.

The stretch ratio B1 at the first step is preferably 1.1 times or more and more preferably 1.5 times or more and preferably 4.0 times or less and more preferably 3.0 times or less. By setting the stretch ratio B1 at the first step equal to or more than the lower limit of this range, the NZ coefficient of the stretched film can be increased. In addition, by setting it equal to or less than the upper limit, the orientation angle of the stretched film can be easily controlled.

The stretching temperature T1 at the first step is preferably equal to or more than Tg° C., more preferably equal to or more than Tg+2° C., and particularly preferably equal to or more than Tg+5° C. and preferably equal to or less than Tg+40° C., more preferably equal to or less than Tg+35° C., and particularly preferably equal to or less than Tg+30° C. Here, Tg is the glass transition temperature of the resin forming the pre-stretch film. In this embodiment, the stretching temperature T1 at the first step means a temperature at the stretch zone 150 of the tenter apparatus 100. By setting the stretching temperature T1 at the first step within this range, molecules contained in the pre-stretch film 20 can be surely oriented and thus the intermediate film 30 having desired optical properties can be easily obtained.

The molecules contained in the pre-stretch film 20 are oriented by the stretching at the first step and thus the intermediate film 30 has the slow axis. The stretching is carried out in a diagonal direction at the first step and thus the slow axis of the intermediate film 30 is expressed in a diagonal direction of the intermediate film. Specifically, the intermediate film 30 usually has the slow axis in a range of 5° to 85° on average with respect to the width direction of the intermediate film 30. Here, that a film has a slow axis in a certain range on average to the width direction means that when orientation angles θ between the width direction and the slow axes at a plurality of points in the width direction of the film are measured, the average value of the orientation angles θ measured at these points is within the certain range described above. The direction of the slow axis of the intermediate film 30 is preferably set depending on the direction of the slow axis of the stretched film to be produced. Usually, the angle between the slow axis and the width direction of the stretched film obtained at the second step is larger than the angle between the slow axis and the width direction of the intermediate film. Consequently, it is preferable that the angle between the slow axis and the width direction of the intermediate film 30 is smaller than the angle between the slow axis and the width direction of the stretched film. For example, the intermediate film 30 has the slow axis in a range of preferably 10° or more and more preferably 20° or more and preferably 40° or less and more preferably 35° or less on average with respect to the width direction of the intermediate film 30. Thereby, a stretched film having an orientation angle θ of around 45° can be obtained easily, and the film can be used in various applications as a film having a slow axis in a direction diagonal to the width direction of the film.

The slow axis of the intermediate film 30 is expressed by stretching the pre-stretch film 20 in a diagonal direction and thus a specific direction of the slow axis of the intermediate film 30 can be adjusted by the aforementioned stretch conditions at the first step. For example, the direction of the slow axis of the intermediate film 30 can be adjusted by adjusting the feed angle φ between the feeding direction D20 of the pre-stretch film 20 from the feed roll 10 and the winding direction D30 of the intermediate film 30. Here, the feeding direction D20 of the pre-stretch film 20 means the traveling direction of the pre-stretch film 20 fed from the feed roll 10. In addition, the winding direction D30 of the intermediate film 30 means the traveling direction of the intermediate film 30 wound as the roll 40.

In addition, the intermediate film 30 usually expresses in-plane retardation by the stretching in a diagonal direction. Generally, in-plane retardation of a film is not constant in a plane and thus the in-plane retardation of the film is usually evaluated by the average in-plane retardation. Specific average in-plane retardation Re1 of the intermediate film 30 is preferably 300 nm or more, more preferably 320 nm or more, and particularly preferably 350 nm or more and preferably 500 nm or less, more preferably 450 nm or less, and particularly preferably 420 nm or less. By setting the average in-plane retardation Re1 of the intermediate film 30 within this range, the stretched film having an average in-plane retardation Re2 of around 140 nm, which is suitable as the optical compensation film of a display device, can be easily obtained.

The average in-plane retardation of the film can be determined by measuring in-plane retardations in a plurality of points at intervals of 50 mm in the width direction of the film and calculating the average value of the in-plane retardations at these points.

1.3. Second Step

In the method for producing the stretched film according to one embodiment of the present invention, the first step is followed by (b) a second step of performing free uniaxial stretching of the intermediate film in a flow direction to obtain a long-length stretched film. Here, the free uniaxial stretching means stretching in one certain direction and not applying constraint force in a direction other than the stretching direction. Consequently, the free uniaxial stretching in a flow direction of the film carried out in this embodiment means stretching carried out in a flow direction without constraining the edge parts in the width direction of the film. Usually, such stretching at the second step is carried out using roll stretching apparatus while continuously conveying the intermediate film in a longitudinal direction.

Figure 2:
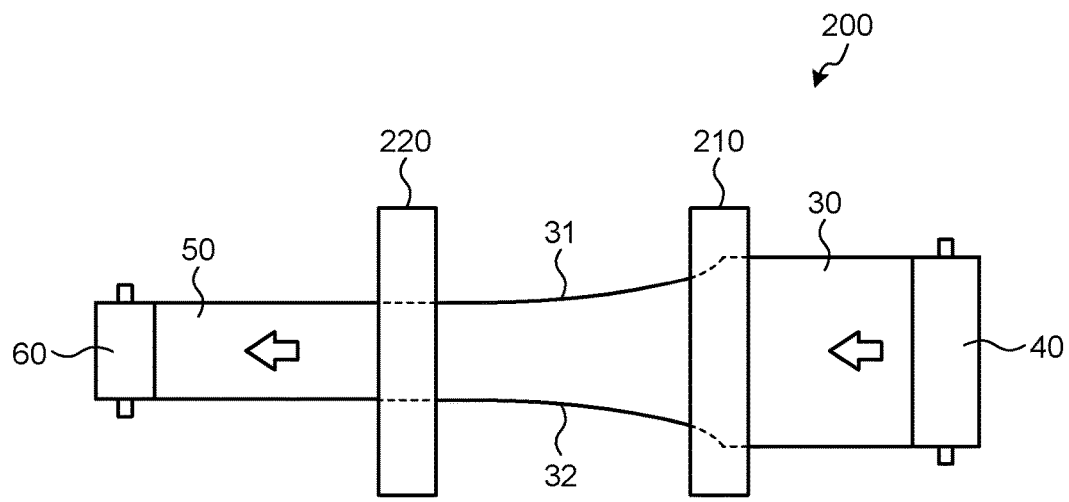
FIG. 2 is a plan view schematically illustrating roll stretch apparatus according to one embodiment of the present invention.

FIG. 2 is a plan view schematically illustrating roll stretching apparatus 200 according to one embodiment of the present invention.

As illustrated in FIG. 2, the roll stretching apparatus 200 according to one embodiment of the present invention is apparatus for stretching the intermediate film 30 fed from the roll 40 in the flow direction of the intermediate film 30 under a heating environment with an oven that is not illustrated.

The roll stretching apparatus 200 includes upstream rolls 210 and downstream rolls 220 as the nip rolls that can convey the intermediate film 30 in the flow direction in an order from the upstream in the conveying direction. Here, the rotation speed of the downstream rolls 220 is set to be faster than the rotation speed of the upstream rolls 210.

The stretching of the intermediate film 30 using the roll stretching apparatus 200 is carried out as follows:

The intermediate film 30 is fed from the roll 40 and the intermediate film 30 is continuously supplied to the roll stretching apparatus 200.

The roll stretching apparatus 200 conveys the supplied intermediate film 30 to the upstream rolls 210 and the downstream rolls 220 in this order. At this time, the rotation speed of the downstream rolls 220 is faster than the rotation speed of the upstream rolls 210 and thus the intermediate film 30 is stretched in the flow direction to obtain a stretched film 50. In the stretching by the roll stretching apparatus 200, both edge parts 31 and 32 in the width direction of the intermediate film 30 are not constrained. Consequently, the width of the intermediate film 30 usually becomes narrower in association with the stretching in the flow direction and thus the stretched film 50 having the narrower width than the width of the intermediate film 30 is obtained. In this embodiment, the unstretched film is used as the pre-stretch film 20 and thus the stretched film 50 is a biaxially stretched film that is stretched in the two directions of the flow direction and the diagonal direction.

The stretched film 50 is wound and collected as a roll 60 after trimming both edge parts of the stretched film 50, if necessary.

The stretch ratio B2 at the second step is set to be smaller than the stretch ratio B1 at the first step. By this setting, the stretched film 50 having the slow axis in the diagonal direction can express a large NZ coefficient without generation of wrinkles. As described above, the stretched film 50 having the slow axis in the direction diagonal to the width direction and the large NZ coefficient can be easily produced by the combination of stretching in the diagonal direction and free uniaxial stretching in the flow direction in this order and setting the stretch ratio to B1>B2.

In the conventional method, when stretching in the flow direction and stretching in the diagonal direction of a resin film are carried out in combination, usually, the stretching in the flow direction is previously carried out and then the stretching in the diagonal direction is carried out. The stretching in this order is easy to increase the width of the stretched film to be produced and easy to control the direction of the slow axis. However, when the inventors of the present invention tried to produce a stretched film having a large NZ coefficient by the conventional method, it was found that wrinkles would appear easily. It was found that in particular the wrinkles due to shrinkage in the width direction of the stretched film would appear easily.

In contrast, as the aforementioned embodiment, when the stretched film 50 having a large NZ coefficient is produced, generation of wrinkles can be reduced by the combination of stretching in the diagonal direction and free uniaxial stretching in the flow direction in this order and setting the stretch ratio to B1>B2. By reducing the generation of wrinkles, conveying performance of the stretched film 50 can be improved and the stretched film 50 can be used as an optical member.

Although the reason why such an excellent effect is obtained is not clear, the reason is inferred as follows according to the study by the inventors of the present invention. However, the present invention is not limited by the following inference.

In the free uniaxial stretching in the flow direction, edge parts in the width direction of the film are free. Consequently, during the stretching carried out at the second step, shrinkage stress contained in the film is released. Therefore, the residual shrinkage stress in the produced stretched film 50 can be reduced even when the stretch ratio B1 is increased at the first step so as to increase the NZ coefficient. It is inferred that this is the reason why wrinkles do not appear on the stretched film 50.

The stretch ratio B2 at the second step is preferably 1.1 times or more, more preferably 1.15 times or more, and particularly preferably 1.2 times or more and preferably 2.0 times or less, more preferably 1.8 times or less, and particularly preferably 1.6 times or less. By setting the stretch ratio B2 at the second step equal to or more than the lower limit of this range, the wrinkles of the stretched film 50 can be prevented. In addition, by setting it equal to or less than the upper limit, the NZ coefficient of the stretched film 50 can be increased.

The total stretch ratio (B1×B2) determined by multiplying the stretch ratio B1 at the first step and the stretch ratio B2 at the second step is preferably 1.1 times or more, more preferably 1.5 times or more, and particularly preferably 1.9 times or more and preferably 4.5 times or less, more preferably 4.2 times or less, and particularly preferably 4.0 times or less. By setting the total stretch ratio equal to or more than the lower limit of this range, the NZ coefficient of the stretched film 50 can be increased. In addition, by setting it equal to or less than the upper limit, the orientation angle of the stretched film 50 can be easily controlled.

The stretching temperature T2 at the second step based on the stretching temperature T1 at the first step is preferably equal to or more than T1−5° C., more preferably equal to or more than T1−4° C., and particularly preferably equal to or more than T1−3° C. and preferably equal to or less than T1+5° C., more preferably equal to or less than T1+4° C., and particularly preferably equal to or less than T1+3° C. By setting the stretching temperature T2 at the second step within the aforementioned range, the average in-plane retardation of the stretched film 50 can be adjusted.

1.4. Stretched Film

Hereinafter, the long-length stretched film produced by the aforementioned production method will be described.

The stretched film produced by the aforementioned production method is a long-length film formed from the same material of the pre-stretch film and has its slow axis in the direction diagonal to the width direction of the stretched film. Specifically, the stretched film has the slow axis in a range of usually 5° or more, preferably 10° or more, and more preferably 20° or more and usually 85° or less and preferably 80° or less on average to the width direction of the stretched film. The long-length stretched film having the slow axis in the diagonal direction as described above can be cut out in a lengthwise direction or a width direction when a polarizing film is produced by laminating with a long-length polarizer. Consequently, the amount of discarded films can be reduced and laminating by roll-to-roll can be carried out.

The fluctuation of the angle between the width direction and the slow axis of the stretched film is preferably 0.3° or less, more preferably 0.2° or less, particularly preferably 0.1° or less, and ideally equal to 0°. Here, fluctuation of the angle between the width direction and the slow axis of the stretched film means the difference between the maximum value and the minimum value in the angles between the width direction and the slow axis at any points of the stretched film. By reducing the fluctuation, the contrast of a liquid crystal display device can be improved when the film cut out from this stretched film is used as an optical compensation film for the liquid crystal display device.

As described above, the stretched film produced by the aforementioned production method can have a high NZ coefficient. Generally, the NZ coefficient of a film is not constant in the plane and thus the NZ coefficient of the film is usually evaluated by the average NZ coefficient. A specific range of the average NZ coefficient can be set depending on the application of the stretched film. The specific value of the average NZ coefficient of the stretched film is preferably 2.0 or more, more preferably 2.1 or more, and particularly preferably 2.2 or more and preferably 3.0 or less, more preferably 2.8 or less, and particularly preferably 2.6 or less.

The average NZ coefficient of the film can be determined by measuring NZ coefficients in a plurality of points at intervals of 50 mm in the width direction of the film and calculating the average value of the NZ coefficients at these points.

The fluctuation of the NZ coefficient of the stretched film is preferably 0.3 or less, more preferably 0.2 or less, particularly preferably 0.1 or less, and ideally equal to 0. Here, fluctuation of NZ coefficient means the difference between the maximum value and the minimum value in the NZ coefficients at any points of the stretched film. By reducing the fluctuation of the NZ coefficients of the stretched film as described above, display quality deterioration of the display device such as color unevenness can be prevented when a film cut out from this stretched film is used for the display device.

In addition, the stretched film produced by the aforementioned production method has the high NZ coefficient and is hardly wrinkled. The wrinkles can be evaluated in accordance with the size change ratio in the stretched film. Specifically, the size change ratio in the width direction of the stretched film that is measured after leaving the stretched film at 100° C. for 1 hour is preferably −0.1% to 0.1%, more preferably −0.05% to 0.1%, and particularly preferably 0% to 0.1%.

The size change ratio can be measured by the following method.

Figure 3:
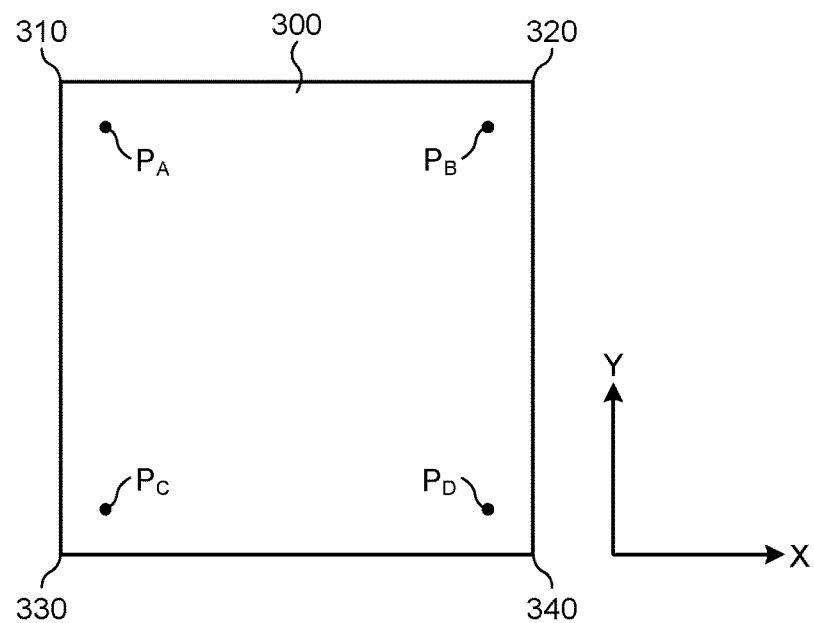
FIG. 3 is a plan view schematically illustrating a test specimen for describing a method for measuring a size change ratio in a stretched film.

FIG. 3 is a plan view schematically illustrating a test specimen for describing a method for measuring size change ratio in a stretched film.

As illustrated in FIG. 3, a square test specimen 300 is cut out from the long-length stretched film so that the test specimen 300 has the sides parallel to the width direction X or the lengthwise direction Y of the stretched film. At this time, the test specimen 300 is cut out to be 120 mm in length of one side. In addition, each test specimen 300 is cut out from the center part and both edge parts in the width direction of the stretched film, that is, three test specimens 300 are cut out in total. In the vicinity of the vertices 310, 320, 330, and 340 of the cut-out test specimen 300, four marked points $P_A$, $P_B$, $P_C$, and $P_D$ are marked at a distance of 10 mm from each of two sides that adjoin at each vicinal vertex to each marked point. Any of the distance between $P_A$ and $P_B$, the distance between $P_A$ and $P_C$, the distance between $P_B$ and $P_D$, and the distance between $P_C$ and $P_D$ are 100 mm.

The test specimen 300 is stored and kept under an environment at 100° C. for 1 hour.

Thereafter, the distance $D_{AB}$ between the marked points $P_A$ and $P_B$ aligned along the width direction X is measured and the displacement $\Delta D_{AB}$ from the distance before the storage (100 mm) is determined. In addition, the distance $D_{CD}$ between the marked points $P_C$ and $P_D$ aligned along the width direction X is measured and the displacement $\Delta D_{CD}$ from the distance before the storage (100 mm) is determined. Here, $\Delta D_{AB}$=100 mm−$D_{AB}$ and $\Delta D_{CD}$=100 mm−$D_{CD}$.

From these $\Delta D_{AB}$ and $\Delta D_{CD}$, the size change ratio $\Delta Ltd$ of each test specimen is calculated in accordance with the following formula.

$$\Delta Ltd=\{(\Delta D_{AB}/100)+(\Delta D_{CD}/100)/2\times100(\%)$$

Then, the average value of the size change ratio $\Delta Ltd$ of the test specimens of the center and both edge parts is calculated and the average value is taken as the size change ratio of the stretched film.

The average in-plane retardation Re2 of the stretched film is usually smaller than the average in-plane retardation Re1 of the intermediate film. The specific average in-plane retardation Re2 of the stretched film is preferably 100 nm or more, more preferably 120 nm or more, and particularly preferably 130 nm or more and preferably 300 nm or less, more preferably 200 nm or less, and particularly preferably 160 nm or less. By having the average in-plane retardation Re2 within such a range, the film cut out from the stretched film is suitably used as the optical compensation film for the display device. Depending on the constitution of the display device to be applied, however, the average in-plane retardation Re2 of the stretched film can be set to any appropriate value.

The fluctuation of the in-plane retardation of the stretched film is preferably 10 nm or less, more preferably 5 nm or less, particularly preferably 2 nm or less, and ideally equal to 0 nm. Here, the fluctuation of the in-plane retardation means the difference between the maximum value and the minimum value in the in-plane retardations at any points of the stretched film. By reducing the fluctuation of in-plane retardation of the stretched film as described above, the display quality of a display device can be made excellent when a film cut out from this stretched film is used as the display device.

The total light transmittance of the stretched film is preferably 80% or more. The light transmittance can be measured with a spectrophotometer (manufactured by JASCO Corporation, ultraviolet-visible-near infrared spectrophotometer "V-570") in accordance with JIS K0115.

The haze of the stretched film is preferably 5% or less, more preferably 3% or less, particularly preferably 1% or less, and ideally equal to 0%. Here, as the haze, 5 points of hazes are measured with "Turbidimeter NDH-300A" manufactured by Nippon Denshoku Industries Co., Ltd. in accordance with JIS K7361-1997 and an average value thereof calculated can be employed.

The amount of the residual volatile components in the stretched film is preferably 0.1% by weight or less, more preferably 0.05% by weight or less, particularly preferably 0.02% by weight or less, and ideally equal to 0%. By reducing the amount of the residual volatile components, the size stability of the stretched film can be improved and the change over time in the optical properties such as the in-plane retardation can be reduced.

Here, the volatile components are substances having a molecular weight of 200 or less contained in the film, and the examples thereof may include residual monomers and solvents. The amount of the volatile components can be quantitatively determined as the total of the substances having a molecular weight of 200 or less contained in the film, by dissolving the film into chloroform and analyzing the chloroform solution with gas chromatography.

The saturated water absorption ratio of the stretched film is preferably 0.03% by weight or less, more preferably 0.02% by weight or less, particularly preferably 0.01% by weight or less, and ideally equal to 0% by weight. When the saturated water absorption ratio of the stretched film is within this range, the change over time in optical properties such as the in-plane retardation can be reduced.

Here, the saturated water absorption ratio is a value represented by percentage of the increased mass after immersing the test specimen of the film in water at 23° C. for 24 hours with respect to the mass of the test specimen of the film before the immersion.

The average thickness of the stretched film is preferably 10 μm or more, more preferably 15 μm or more, and further preferably 30 μm or more and preferably 100 μm or less, more preferably 80 μm or less, and further preferably 60 μm or less. By setting the thickness within this range, the mechanical properties of the stretched film can be enhanced.

Here, the average thickness of the stretched film is determined by measuring thicknesses at a plurality of points at intervals of 50 mm in the width direction of the film and calculating the average value of the thicknesses at these points.

The width of the stretched film is preferably 1,300 mm or more, more preferably 1,400 mm or more, and particularly preferably 1,500 mm or more. There is no particular upper limit of the width and the width is preferably 2,000 mm or less and more preferably 1,800 mm or less.

The stretched film can be used as, for example, a phase difference film and a viewing angle compensation film singly or in combination with other members.

1.5. Modification Example

The present invention is not limited to the embodiment described above, and can be employed after further modifications.

For example, the aforementioned production method may further have optional steps other than the first step and the second step. As such steps, for example, a step of providing a protection layer on the surface of the stretched film may be carried out.

In addition, for example, a film formed by stretching an unstretched film in any direction may be used as a pre-stretch film. As described above, as a method for stretching the pre-stretch film before the first step, for example, lengthwise stretch methods such as a roll method and a float method and a transverse stretch method using tenter apparatus can be used.

In the aforementioned embodiment, the intermediate film 30 is wound to form the roll 40 and the intermediate film 30 is fed from the roll 40 to be supplied to the second step. The intermediate film 30 obtained at the first step, however, may be supplied to the second method without winding.

2. Polarizing Film

The long-length polarizing film of the present invention includes the aforementioned long-length stretched film and a long-length polarizer.

Example of the polarizer may include a polarizer formed by applying appropriate treatment such as dyeing treatment with a dichroic substance such as iodine and a dichroic dye, stretching treatment, and cross-linking treatment to a film of a suitable vinyl alcohol-based polymer such as polyvinyl alcohol and partially-formalized polyvinyl alcohol in an appropriate order and method. Such polarizers can transmit the linearly polarized light when natural light enters. In particular, polarizers having excellent light transmittance and excellent polarization degree are preferable. The thickness of the polarizer is generally 5 μm to 80 μm but not limited to the range.

The stretched film may be provided on both sides or on a single side of the polarizer. Conventionally, the surface of the polarizer has been provided with a protection film. The stretched film, however, can play a role of a protection film for a polarizer by combing the stretched film with the polarizer. Consequently, the polarizing film formed by providing a combination of the stretched film and the polarizer can be used without the conventionally-used protection film and thus this polarizing film can contribute to thin film formation.

The polarizing film can be produced by, for example, laminating the long-length polarizer and the long-length stretched film by roll-to-roll in parallel with the longitudinal direction of the long-length polarizer and the long-length stretched film. At the time of lamination, an adhesive can be used, if necessary. By producing the polarizing film using the long-length films, the long-length polarizing film can be effectively produced.

The polarizing film may include optional members other than the stretched film and the polarizer, if necessary. Examples of the optional members may include the protection film for protecting the polarizer. As the protection film, any transparent film can be used. Among them, a resin film having transparency, mechanical strength, heat stability, a moisture shielding property, and the like is preferable. Examples of such resins may include an acetate resin such as triacetyl cellulose, a polyester resin, a polyether sulfone resin, a polycarbonate resin, a polyamide resin, a polyimide resin, a polyolefin resin, a polymer resin having an alicyclic structure, and a (meth)acrylic resin. Among them, the acetate resin, the polymer resin having the alicyclic structure, and the (meth)acrylic resin are preferable from the viewpoint of low birefringence, and the polymer resins having the alicyclic structure is particularly preferable from the viewpoints of transparency, low hygroscopicity, size stability, and light weight.

3. Display Device

The long-length stretched film produced by the aforementioned production method can be used as an optical film such as the phase difference film by cutting out in a desired size depending on the use form of the stretched film. The long-length polarizing film can be used as a polarizing plate by cutting out in a desired size depending on the use form of the polarizing film. At the time of cutting out, the film is preferably cut out in a perpendicular or parallel direction with respect to the width direction of the long-length film. These optical films and the polarizing plates can be used for, for example, a display device such as a liquid crystal display device.

Such a liquid crystal display device includes the optical film or the polarizing plate. Specific examples of the liquid crystal display device may include a liquid crystal display device including a liquid crystal panel capable of changing the orientation of the liquid crystal by voltage adjustment and polarizing plates located so as to sandwich the liquid crystal panel. In addition, the optical film cut out from the stretched film can be included in the liquid crystal display device for, for example, optical compensation and polarization conversion.

In addition, the liquid crystal display device usually include a member for sending light to the liquid crystal panel, on the side opposite to the display face with respect to the liquid crystal panel. Examples of such a member may include a reflector plate for a reflection-type liquid crystal display device and a backlight device for a transparent-type liquid crystal display device. Examples of the backlight device may include a cold-cathode tube, a mercury plane lamp, a light-emitting diode, and EL. Among them, the reflection-type liquid crystal display device including the liquid crystal panel of a reflection-type display system is preferable.

The liquid crystal panel is not particularly limited by the display mode thereof. Examples of the display mode of the liquid crystal panel may include an in-plane switching (IPS) mode, a vertical alignment (VA) mode, a multi-domain vertical alignment (MVA) mode, a continuous pinwheel alignment (CPA) mode, a hybrid alignment nematic (HAN) mode, a twisted nematic (TN) mode, a super twisted nematic (STN) mode, and an optical compensated bend (OCB) mode.

When the liquid crystal display device is produced, the aforementioned polarizing plate is usually laminated to the liquid crystal panel. At this time, the polarizing plate obtained by cutting out the long-length polarizing film in a desired shape may be laminated to the liquid crystal panel, or the long-length polarizing film and the liquid crystal panel may be laminated and then the laminated polarizing film may be cut out in accordance with the size of the liquid crystal panel. The polarizing film produced by using the aforementioned long-length stretched film can be cut out in perpendicular or in parallel to the width direction at the time of cutting out in order to be laminated to the liquid crystal panel, and thus the polarizing film has excellent production efficiency.

The liquid crystal display device can include optional members other than the liquid crystal panel, the polarizing plate, and the optical film. Examples of the optional members may include a prism array sheet, a lens array sheet, an optical diffusion plate, and a brightness enhancement film.

EXAMPLES

Hereinafter, the present invention will be specifically described with reference to Examples. The present invention, however, is not limited to the following Examples. The present invention may be embodied with any modifications within the scope of the claims of the present invention and equivalents thereof.

Unless otherwise specified, "part" and "%" in the following description representing an amount are based on weight. Unless otherwise specified, the procedures described below were performed under the conditions of normal temperature and normal pressure.

[Evaluation Method]

(1. Method for Measuring Average in-Plane Retardation of Film)

In-plane retardations were measured at a plurality of points at intervals of 50 mm in the width direction of a film using a phase difference meter ("KOBRA-21ADH", manufactured by Oji Scientific Instruments Co., Ltd.). The average value of the in-plane retardations at these points was calculated and this average value was taken as the average in-plane retardation of the film. At this time, the measurement wavelength was set to 590 mm.

(2. Method for Measuring Average NZ Coefficient of Film)

NZ coefficients were measured at a plurality of points at intervals of 50 mm in the width direction of a film using the phase difference meter ("KOBRA-21ADH", manufactured by Oji Scientific Instruments Co., Ltd.). The average value of the NZ coefficients at these points was calculated and this average value was taken as the average NZ coefficient of the film. At this time, the measurement wavelength was set to 590 mm.

(3. Method for Measuring Average Orientation Angle of Film)

In-plane slow axes were observed at a plurality of points at intervals of 50 mm in the width direction of a film using a polarization microscope ("BX51", manufactured by Olympus Corporation) to measure orientation angles between the slow axes and the width direction of the film. The average value of the orientation angles at these points was calculated and this average value was taken as the average orientation angle of the film.

(4. Method for Measuring Size Change Ratio in Film)

As illustrated in FIG. 3, a square test specimen 300 was cut out from the long-length film so that the test specimen 300 has sides parallel to the width direction X or the lengthwise direction Y of the film. At this time, the length of one side of the test specimen was adjusted to 120 mm. Test specimens 300 were cut out from the center part and both edge parts in the width direction of the stretched film. That is, three test specimens 300 are cut out in total. In the vicinity of the vertices 310, 320, 330, and 340 of the cut-out test specimen 300, four marked points $P_A$, $P_B$, $P_C$, and $P_D$ were marked at a distance of 10 mm from each of two sides that adjoin at each vicinal vertex to each marked point. At this time, any of the distance between $P_A$ and $P_B$, the distance between $P_A$ and $P_C$, the distance between $P_B$ and $P_D$, and the distance between $P_C$ and $P_D$ were 100 mm.

The test specimen 300 was stored and kept under an environment at 100° C. for 1 hour.

Thereafter, the distance $D_{AB}$ between the marked points $P_A$ and $P_B$ aligned along the width direction X was measured and the displacement $\Delta D_{AB}$ from the distance before the storage (100 mm) was determined. In addition, the distance $D_{CD}$ between the marked points $P_C$ and $P_D$ aligned along the width direction X was measured and the displacement $\Delta D_{CD}$ from the distance before the storage (100 mm) was determined. Here, $\Delta D_{AB}=100$ mm$-D_{AB}$ and $\Delta D_{CD}=100$ mm$-D_{CD}$.

From these displacements $\Delta D_{AB}$ and $\Delta D_{CD}$, the size change ratio $\Delta$Ltd of each test specimen was calculated in accordance with the following formula. Here, the unit of the displacements $\Delta D_{AB}$ and $\Delta D_{CD}$ is millimeter.

$$\Delta Ltd=\{(\Delta D_{AB}/100)+(\Delta D_{CD}/100)\}/2\times100(\%)$$

Then, the average value of the size change ratio $\Delta$Ltd of the center and both edge parts test specimens was calculated and the average value was taken as the size change ratio of the stretched film.

At this time, for the measurement of distances between the marked points $P_A$, $P_B$, $P_C$, and $P_D$, a universal projector ("V-12B", manufactured by Nikon Corporation) was used.

(5. Evaluation of Conveying Performance)

Evaluation of conveying performance of the film was carried out by visually observing the film to determine the presence or absence of wrinkles. The film in which wrinkles were not observed was determined as "good", whereas the film in which wrinkles was observed was determined as "poor".

(6. Method for Measuring Molecular Weight of Polymer)

The weight average molecular weight (Mw) and the number average molecular weight (Mn) were measured at 40° C. in terms of the standard polyisoprene by gel permeation chromatography (GPC) using cyclohexane as an eluent.

As the measuring apparatus, HLC8120GPC manufactured by Tosoh Corporation was used.

Among the standard polyisoprenes manufactured by Tosoh Corporation, ten standard polyisoprenes having weight average molecular weights Mw of 602, 1,390, 3,920, 8,050, 1,3800, 22,700, 58,800, 71,300, 109,000, and 280,000 were used as the standard polyisoprenes.

The sample was prepared by dissolving a measurement sample by heating in cyclohexane at 40° C. so that the sample concentration was adjusted to 4 mg/ml.

In the measurement, three columns of TSKgel G5000HXL, TSKgel G4000HXL, and TSKgel G2000HXL were used by serially connecting these columns. The measurement was carried out under conditions of a flow rate of 1.0 ml/minute, an amount of injected sample of 100 μml, and a column temperature of 40° C.

(7. Method for Measuring Glass Transition Temperature (Tg) of Polymer)

The glass transition temperature (Tg) of the polymer was measured using a differential scanning calorimeter in accordance with JIS K 6911.

(8. Method for Measuring Hydrogenation Ratio of Polymer)

The hydrogenation ratio of the polymer was measured by $^1$H-NMR spectrum using a mixed solvent of deuterated chloroform/carbon tetrachloride (deuterated chloroform/carbon tetrachloride=1/1 in a weight ratio).

Production Example 1

(Ring-Opening Polymerization)

In the following description, unless otherwise specified, "DCP" represents tricyclo[4.3.0.1$^{2,5}$]deca-3-ene; "TCD" represents tetracyclo[4.4.0.1$^{2,5}$.1$^{7,10}$]dodeca-3-ene; and "MTF" represents tetracyclo[9.2.1.0$^{2,10}$.0$^{3,8}$]tetradeca-3,5,7,12-tetraene.

In a reaction vessel replaced with nitrogen, 7 parts of a mixture of DCP, TCD, and MTF (DCP/TCD/MTF=55/40/5 in a weight ratio) and 1600 parts of cyclohexane were added. The amount of the mixture of DCP, TCD, and MTF is 1% by weight with respect to the total amount of monomers used in the polymerization. In the reaction vessel, 0.55 parts of tri-i-butylaluminum, 0.21 parts of isobutyl alcohol, 0.84 parts of diisopropyl ether as a reaction conditioning agent, and 3.24 parts of 1-hexene as a molecular weight modifier were further added. To this mixture, 24.1 parts of 0.65% tungsten hexachloride solution dissolved in cyclohexane was added and the resultant mixture was stirred at 55° C. for 10 minutes. Then, while maintaining the reaction system at 55° C., 693 parts of the mixture of DCP, TCD, and MTF (DCP/TCD/MTF=55/40/5 in a weight ratio) and 48.9 parts of 0.65% tungsten hexachloride solution dissolved in cyclohexane each were continuously dropped into the system over 150 minutes. Thereafter, the reaction was continued for 30 minutes and then the polymerization was terminated. By this operation, a ring-opening polymerization reaction liquid containing a ring-opening polymer in cyclohexane was obtained.

After completion of the polymerization, the polymerization conversion of the monomer measured by gas chromatography at the time of polymerization termination was 100%.

(Hydrogenation)

The obtained ring-opening polymerization reaction liquid was transferred to a pressure resistance hydrogenation reactor. To the ring-opening polymerization reaction liquid, 1.4 parts of diatomaceous earth supported nickel catalyst (manufactured by Nikki Chemical Co., Ltd., product name "T8400RL", ratio of supported nickel 57%) and 167 part of cyclohexane were added, and the resultant mixture was reacted at 180° C. for 6 hours at a hydrogen pressure of 4.6 MPa. By this hydrogenation reaction, a reaction solution containing the hydrogenated product of the ring-opening polymer was obtained. The reaction solution was filtered under a pressure of 0.25 MPa using Funda Filter (product name, manufactured by Ishikawajima-Harima Heavy Industries Co., Ltd.) with Radiolite #500 as a filtration bed to remove the hydrogenation catalyst. A colorless clear solution was thus obtained.

Subsequently, 0.5 part of an antioxidant (pentaerythritol tetrakis[3-(3,5-di-t-butyl-4-hydroxyphenyl)propionate], manufactured by Ciba Specialty Chemicals Inc., product name "Irganox 1010") per 100 parts of the hydrogenated product was added to the obtained solution and dissolved. Subsequently, the resultant solution was sequentially filtered with ZetaPlus filter 30H (manufactured by Cuno Filter Corporation, pore diameter 0.5 μm to 1 μm) and then filtered with another metal fiber filter (manufactured by NICHIDAI CORPORATION, pore diameter 0.4 μm) to remove microscopic solids. The hydrogenation ratio of the hydrogenated product of the ring-opening polymer was 99.9%.

Subsequently, the solution obtained by the filtration was treated with a cylindrical concentration dryer (manufactured by Hitachi, Ltd.) at a temperature of 270° C. and a pressure of 1 kPa or less to remove the solvent cyclohexane and other volatile components. The solid content contained in the solution was extruded from the die directly connected to the concentration dryer as strands in a melted state and cooled to obtain the pellets of the hydrogenated product of the ring-opening polymer. The hydrogenated product of the ring-opening polymer constituting the pellets had a weight average molecular weight (Mw) of 38,000, a molecular weight distribution (Mw/Mn) of 2.5, and a glass transition temperature Tg of 129° C.

Example 1

(Production of Long-Length Resin Film)

As the polymer resin having an alicyclic structure, the pellets of the hydrogenated product of the ring-opening polymer obtained in Production Example 1 were prepared and dried at 100° C. for 5 hours. These pellets were supplied to an extruder, melted in the extruder, passed through a polymer pipe and a polymer filter and extruded from a T-die on a casting drum as a sheet-like extrudate. The extruded resin was cooled and cured on the casting drum to obtain a long-length pre-stretch film having a thickness of 100 μm. This pre-stretch film was wound to obtain a feed roll.

(First Step)

As illustrated in FIG. 1, the long-length pre-stretch film 20 was fed from the feed roll 10, supplied to tenter stretching apparatus 100 having the structure described in the aforementioned embodiment, and stretched in a diagonal direction under conditions listed in Table 1 to obtain an intermediate film 30. The obtained intermediate film 30 was wound and collected as a roll 40. At this time, the feed angle φ between the feeding direction D20 of the pre-stretch film 20 from the feed roll 10 and the winding direction D30 of the intermediate film 30 was set to 25°. A part of the obtained intermediate film 30 was used to measure the average in-plane retardation Re1 and the average orientation angle of the intermediate film 30.

(Second Step)

The intermediate film obtained at the first step was subjected to free uniaxial stretching in the flow direction under conditions listed in Table 1, to thereby obtain a stretched film. By trimming both edges of 150 mm in the width direction of the stretched film, a long-length stretched film having a width of 1330 mm was obtained. This stretched film was used to evaluate the average in-plane retardation Re2, the average orientation angle, the average NZ coefficient, the size change ratio, and the conveying performance of the stretched film.

Examples 2 to 5 and Comparative Examples 1 to 4

The long-length intermediate films and stretched films were produced and evaluated in the same manner as in Example 1 except that the order of the stretching in the diagonal direction and the stretching in the flow direction, the stretch ratio, and the stretching temperature were changed as listed in Table 1.

[Results]

The results of Examples and Comparative Examples are listed in Table 1. In Table 1, Re represents the average in-plane retardation. In the rows of stretch direction in Table 1, "diagonal" represents that the stretch direction is in the diagonal direction and "lengthwise" represents that the stretch direction is in the flow direction. In Table 1, the average in-plane retardation Re and the average orientation angle listed in the rows of the first step represent the measured results of the long-length intermediate film obtained at the first step. In addition, the average in-plane retardation Re, the average orientation angle, the average NZ coefficient, the size change ratio, and the conveying performance listed in the rows of the second step represent the measured results of the long-length stretched film obtained at the second step.

TABLE 1

[results from Examples and Comparative Examples]

|  |  | Examples |  |  |  |  | Comparative Examples |  |  |  |
|---|---|---|---|---|---|---|---|---|---|---|
|  |  | 1 | 2 | 3 | 4 | 5 | 1 | 2 | 3 | 4 |
| (1)* | Stretch direction | Diagonal | Diagonal | Diagonal | Diagonal | Diagonal | Lengthwise | Lengthwise | Diagonal | Diagonal |
|  | Stretch ratio (times) | 1.9 | 1.9 | 1.9 | 2.0 | 3.0 | 1.6 | 1.2 | 1.25 | 1.25 |
|  | Temperature (° C.)* | 132 | 131 | 133 | 136 | 131 | 135 | 140 | 135 | 135 |
|  | Re (nm) | 360 | 400 | 325 | 450 | 300 | 420 | 160 | 140 | 140 |
|  | Average orientation angle (°) | 25 | 23 | 23 | 30 | 15 | 90 | 90 | 15 | 45 |
| (2)* | Stretch direction | Lengthwise | Lengthwise | Lengthwise | Lengthwise | Lengthwise | Diagonal | Diagonal | Lengthwise | Lengthwise |
|  | Stretch ratio (times) | 1.25 | 1.20 | 1.25 | 1.20 | 1.4 | 1.8 | 1.7 | 1.6 | 1.4 |
|  | Temperature (° C.) | 129 | 131 | 129 | 132 | 129 | 136 | 136 | 138 | 133 |
|  | Re (nm) | 141 | 100 | 141 | 120 | 100 | 141 | 140 | 140 | 140 |
|  | Average orientation angle (°) | 45 | 45 | 45 | 60 | 75 | 45 | 45 | 45 | 75 |
|  | Average NZ coefficient | 2.3 | 2.3 | 2.1 | 2.0 | 2.9 | 2.5 | 1.6 | 1.1 | 1.1 |
|  | Size change ratio (%) | 0.05 | 0.01 | 0.05 | 0.04 | 0.03 | −0.20 | −0.10 | 0.02 | 0.01 |

TABLE 1-continued

[results from Examples and Comparative Examples]

|  | Examples | | | | | Comparative Examples | | | |
|---|---|---|---|---|---|---|---|---|---|
|  | 1 | 2 | 3 | 4 | 5 | 1 | 2 | 3 | 4 |
| Conveying performance | Good | Good | Good | Good | Good | Poor | Good | Good | Good |

(1)* First step
(2)* Second step

DISCUSSION

From Table 1, it has been ascertained that the stretched film having a slow axis in the diagonal direction and a high NZ coefficient can be produced by the combination of carrying out the stretching in the diagonal direction and the free uniaxial stretching in the flow direction in this order and setting the stretch ratio B1 in the diagonal direction larger than the stretch ratio B2 in the flow direction.

DESCRIPTION OF NUMERALS 10 feed roll
20 pre-stretch film
21 and 22 edge parts in the width direction of pre-stretch film
30 intermediate film
31 and 32 edge parts in the width direction of intermediate film
40 roll
50 stretched film
60 roll
100 tenter apparatus
110R and 110L gripping elements
120R and 120L guide rails
130 inlet part of tenter apparatus
140 outlet part of tenter apparatus
150 stretch zone of tenter apparatus
200 roll stretching apparatus
210 upstream rolls
220 downstream rolls
300 test specimen
310, 320, 330 and 340 vertices of test specimen

The invention claimed is:

1. A method for producing a stretched film, the method comprising:
   (a) a first step of stretching a long-length pre-stretch film in a diagonal direction at a stretch ratio B1 to obtain a long-length intermediate film that has an average in-plane retardation Re1 of the long-length intermediate film is 300 nm or more; and
   after the first step, (b) a second step of performing free uniaxial stretching of the long-length intermediate film that has an average in-plane retardation Re1 of the long-length intermediate film is 300 nm or more in a flow direction at a stretch ratio B2 while continuously conveying the long-length intermediate film to obtain a long-length stretched film, wherein
   the stretch ratios satisfy B1>B2;
   an average NZ coefficient of the stretched film is 2.0 to 3.0
   the expression "long-length" means a shape in which the length is 5 times or more longer than a width thereof; and
   the NZ coefficient is a value represented by (nx−nz)/(nx−ny), where nx represents a refractive index in a direction perpendicular to a thickness direction and in a direction providing the maximum refractive index, ny represents a refractive index in a direction perpendicular to the thickness direction and in a direction orthogonal to the direction of nx, and nz represents a refractive index in the thickness direction.

2. The method for producing a stretched film according to claim 1, wherein
   the stretch ratio B1 at the first step is 1.5 times to 4.0 times; and
   the stretch ratio B2 at the second step is 1.1 times to 2.0 times.

3. The method for producing a stretched film according to claim 1, wherein
   the long-length intermediate film has a slow axis in a range of 10° to 35° on average with respect to a width direction of the long-length intermediate film; and
   the stretched film has a slow axis in a range of 10° to 80° on average with respect to a width direction of the stretched film.

4. The method for producing a stretched film according to claim 1, wherein a stretching temperature T1 at the first step and a stretching temperature T2 at the second step satisfy T1−5° C.<T2<T1+5° C.

5. The method for producing a stretched film according to claim 1, wherein
   an average in-plane retardation Re2 of the stretched film is 100 nm to 200 nm.

* * * * *